(12) United States Patent
Cadima (10) Patent No.: US 9,504,351 B2
(45) Date of Patent: Nov. 29, 2016

(54) DOUBLE OVEN APPLIANCE

(71) Applicant: General Electric Company, Schenectady, NY (US)

(72) Inventor: Paul Bryan Cadima, Prospect, KY (US)

(73) Assignee: Haler U.S. Appliance Solutions, Inc., Wilmington, DE (US)

( * ) Notice: Subject to any disclaimer, the term of this patent is extended or adjusted under 35 U.S.C. 154(b) by 529 days.

(21) Appl. No.: 14/051,507

(22) Filed: Oct. 11, 2013

(65) Prior Publication Data

US 2015/0101592 A1    Apr. 16, 2015

(51) Int. Cl.
*A47J 37/06* (2006.01)
*F24C 3/08* (2006.01)
*F24C 15/18* (2006.01)
*F24C 11/00* (2006.01)
*F24C 1/04* (2006.01)
*A21B 1/02* (2006.01)
*A21B 1/06* (2006.01)

(52) U.S. Cl.
CPC ............ *A47J 37/0682* (2013.01); *F24C 3/087* (2013.01); *F24C 11/00* (2013.01); *F24C 15/18* (2013.01); *A21B 1/06* (2013.01)

(58) Field of Classification Search
CPC .... A47J 37/0682; A47J 37/01; A47J 37/015; A47J 37/067; A47J 37/0676; F24C 3/087; F24C 15/18; F24C 1/02; F24C 7/046; F24C 7/067; F24C 11/00; A21B 1/06
USPC .......... 126/41 R, 39 AB, 39 BA, 39 B, 19 R, 126/273 R
IPC ............... A47J 37/06; A21N 1/02; F24C 1/04, F24C 1/02, 3/08, 11/00, 15/18
See application file for complete search history.

(56) References Cited

U.S. PATENT DOCUMENTS

| 1,475,608 | A | * | 11/1923 | Templeton | F24C 11/00 126/36 |
| 1,589,993 | A | * | 6/1926 | Siegler | F24C 3/087 239/543 |
| 1,624,298 | A | * | 4/1927 | White | F24C 3/087 126/44 |
| 1,790,739 | A | * | 2/1931 | Antrim | F24C 3/087 126/39 E |
| 1,954,580 | A | * | 4/1934 | Toomey | F24C 3/027 126/214 D |

(Continued)

FOREIGN PATENT DOCUMENTS

| JP | 01019224 A | * | 1/1989 |
| JP | 02017327 A | * | 1/1990 |
| JP | 02057809 A | * | 2/1990 |

*Primary Examiner* — Gregory Huson
*Assistant Examiner* — Daniel E Namay
(74) *Attorney, Agent, or Firm* — Dority & Manning, P.A.

(57) ABSTRACT

Double oven appliances are provided. In one embodiment, a double oven appliance includes a cabinet that extends between a top portion and a bottom portion along a vertical direction, an upper cooking chamber defined adjacent the top portion of the cabinet, the upper cooking chamber including a top wall and a bottom wall spaced apart along the vertical direction, and a lower cooking chamber defined adjacent the bottom portion of the cabinet, the lower cooking chamber including a top wall and a bottom wall spaced apart along the vertical direction. The double oven appliance further includes a baking gas burner disposed adjacent the bottom wall of the upper cooking chamber and configured to heat the upper cooking chamber, at least a portion of the baking gas burner spaced from a center point of the upper cooking chamber along a lateral direction.

17 Claims, 4 Drawing Sheets

(56) References Cited

U.S. PATENT DOCUMENTS

| | | | | |
|---|---|---|---|---|
| 2,011,848 A * | 8/1935 | Chambers | F24C 3/085 | 126/25 A |
| 2,102,482 A * | 12/1937 | Parker | F24C 3/087 | 126/41 R |
| 2,746,448 A * | 5/1956 | Holmsten | F24C 3/027 | 126/19 R |
| 2,790,434 A * | 4/1957 | Del Francia | A47J 37/0682 | 126/214 C |
| 2,798,930 A * | 7/1957 | Frost | F24C 7/06 | 126/19 R |
| 2,836,697 A * | 5/1958 | Jordan | F24C 7/06 | 126/41 R |
| 2,844,702 A * | 7/1958 | Staats | F24C 7/06 | 126/41 R |
| 3,114,363 A * | 12/1963 | Solon | F23D 14/14 | 126/41 R |
| 3,357,475 A * | 12/1967 | Schweitzer | F23D 14/10 | 126/41 R |
| 4,718,400 A * | 1/1988 | Lotz | F24C 15/18 | 126/19 R |
| 4,763,638 A * | 8/1988 | Hurley | F24C 14/025 | 126/21 A |
| 4,796,600 A * | 1/1989 | Hurley | F24C 15/006 | 126/21 R |
| 5,275,147 A * | 1/1994 | Aktinson, III | F24C 1/04 | 126/39 BA |
| 7,210,475 B2 | 5/2007 | Barnes et al. | | |
| 8,344,289 B2 * | 1/2013 | Rogers | F24C 7/00 | 126/198 |
| 8,764,437 B2 * | 7/2014 | Ryu | F23D 14/065 | 126/39 E |
| 9,021,942 B2 * | 5/2015 | Lee | F24C 3/085 | 126/21 A |
| 9,080,774 B2 * | 7/2015 | Kim | F24C 3/087 | |
| 9,188,343 B2 * | 11/2015 | Cadima | F24C 3/087 | |
| 9,404,661 B2 * | 8/2016 | Kim | F24C 7/067 | |
| 2006/0065263 A1 * | 3/2006 | Barritt | F24C 7/082 | 126/41 R |
| 2006/0070612 A1 * | 4/2006 | Horton | F24C 7/082 | 126/19 R |
| 2008/0210217 A1 * | 9/2008 | Offredi | F23D 14/10 | 126/39 E |
| 2010/0044363 A1 | 2/2010 | Butcher et al. | | |
| 2010/0263655 A1 * | 10/2010 | Ryu | F23D 14/10 | 126/39 E |
| 2010/0263656 A1 * | 10/2010 | Ryu | F23D 14/065 | 126/39 E |
| 2011/0091830 A1 * | 4/2011 | Trice | F24C 3/087 | 432/1 |
| 2011/0139142 A1 * | 6/2011 | Schalueck | F24C 3/087 | 126/39 E |
| 2011/0186034 A1 * | 8/2011 | Kim | F24C 3/087 | 126/39 E |
| 2011/0186036 A1 * | 8/2011 | Kim | F24C 3/087 | 126/39 E |
| 2011/0186038 A1 * | 8/2011 | Kim | F23D 14/10 | 126/39 R |
| 2011/0209694 A1 * | 9/2011 | Yang | F24C 3/087 | 126/19 R |
| 2011/0265781 A1 * | 11/2011 | Kim | F23D 14/58 | 126/39 E |
| 2012/0037147 A1 | 2/2012 | Kim et al. | | |
| 2012/0266859 A1 * | 10/2012 | Park | F24C 3/128 | 126/273 R |
| 2012/0266860 A1 * | 10/2012 | Kim | F24C 3/087 | 126/273 R |
| 2012/0266861 A1 * | 10/2012 | Kim | F24C 3/10 | 126/39 E |
| 2012/0266862 A1 * | 10/2012 | Ryu | F23D 14/065 | 126/39 R |
| 2013/0299485 A1 * | 11/2013 | Lee | F24C 7/046 | 219/399 |
| 2013/0334197 A1 * | 12/2013 | Kim | F24C 7/067 | 219/395 |
| 2014/0048058 A1 * | 2/2014 | Donarski | F24C 7/06 | 126/39 BA |
| 2014/0196712 A1 * | 7/2014 | Cadima | F24C 3/087 | 126/41 R |
| 2014/0196713 A1 * | 7/2014 | Cadima | F23D 14/045 | 126/41 R |
| 2015/0027429 A1 * | 1/2015 | Nelson | F24C 15/023 | 126/19 R |

* cited by examiner

DOUBLE OVEN APPLIANCE

FIELD OF THE INVENTION

The present subject matter relates generally to oven appliances, and specifically to double oven appliances. In particular, the present subject matter relates to the positioning of burners in double oven appliances.

BACKGROUND OF THE INVENTION

Double oven range appliances generally include a cabinet that defines upper and lower cooking chambers for baking or broiling food items therein, and may further include a cooktop positioned at a top portion of the cabinet for grilling, boiling or frying food items thereon. To heat the cooking chambers, double oven range appliances include heating elements, such as bake and/or broil heating elements positioned adjacent top and/or bottom portions of the cooking chambers. During operation of such heating elements, the cabinet and other components of the double oven range appliance can be heated to facilitate baking or broiling of food items contained therein.

Current practice is generally to utilize a single, centrally located baking gas burner adjacent the lower wall of the upper cooking chamber. However, such arrangement can result in various disadvantages. For example, flame spreaders are typically attached to such single burner to distribute heat before the heat is provided into the upper cooking chamber. This can cause excess heating of the lower wall of the upper cooking chamber, which can cause excess exposure of food items to such heat and lead to uneven cooking and/or overcooking thereof Another current practice is to utilize a single, centrally located broiling gas burner in the upper cooking chamber adjacent the upper wall thereof However, such arrangement also can result in various disadvantages. For example, the generally smaller upper cooking chamber generally has a lower venting stack height and thus requires a larger cross-sectional vent area in order to handle gas combustion byproducts. This increased cross-section in turn allows excess venting during cooking when the upper cooking chamber is hot, thus requiring increased operation of the broiling gas burner and/or baking gas burner to maintain the required temperatures.

One solution to the above-identified issues is to move the broiling gas burner to the lower cooking chamber. However, this approach would decrease the usable volume of the lower cooking chamber, which is generally undesirable to users. Further, such approach could increase the risk that neither cooking chamber could handle relatively larger food items.

Accordingly, an improved double oven appliance would be desired in the art. In particular, a double oven appliance that decreased or eliminated excess heating and venting issues while maintaining or increasing chamber usable volumes would be advantageous.

BRIEF DESCRIPTION OF THE INVENTION

In accordance with one embodiment of the present disclosure, a double oven appliance is provided. The double oven appliance defines a vertical direction, a lateral direction, and a transverse direction that are each perpendicular to each other. The double oven appliance includes a cabinet that extends between a top portion and a bottom portion along the vertical direction, an upper cooking chamber defined adjacent the top portion of the cabinet, the upper cooking chamber including a top wall and a bottom wall spaced apart along the vertical direction, and a lower cooking chamber defined adjacent the bottom portion of the cabinet, the lower cooking chamber including a top wall and a bottom wall spaced apart along the vertical direction. The double oven appliance further includes a baking gas burner disposed adjacent the bottom wall of the upper cooking chamber and configured to heat the upper cooking chamber, at least a portion of the baking gas burner spaced from a center point of the upper cooking chamber along the lateral direction.

In accordance with another embodiment of the present disclosure, a double oven appliance is provided. The double oven appliance defines a vertical direction, a lateral direction, and a transverse direction that are each perpendicular to each other. The double oven appliance includes a cabinet that extends between a top portion and a bottom portion along the vertical direction, an upper cooking chamber defined adjacent the top portion of the cabinet, the upper cooking chamber including a top wall and a bottom wall spaced apart along the vertical direction, and a lower cooking chamber defined adjacent the bottom portion of the cabinet, the lower cooking chamber including a top wall and a bottom wall spaced apart along the vertical direction. The double oven appliance further includes a first baking gas burner and a second baking gas burner disposed adjacent the bottom wall of the upper cooking chamber and configured to heat the upper cooking chamber, at least a portion of the first and second baking gas burners spaced from and opposite each other relative to a center point of the upper cooking chamber along the lateral direction. At least a portion of the top wall of the lower cooking chamber is above a bottom point of the first baking gas burner and the second baking gas burner along the vertical direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
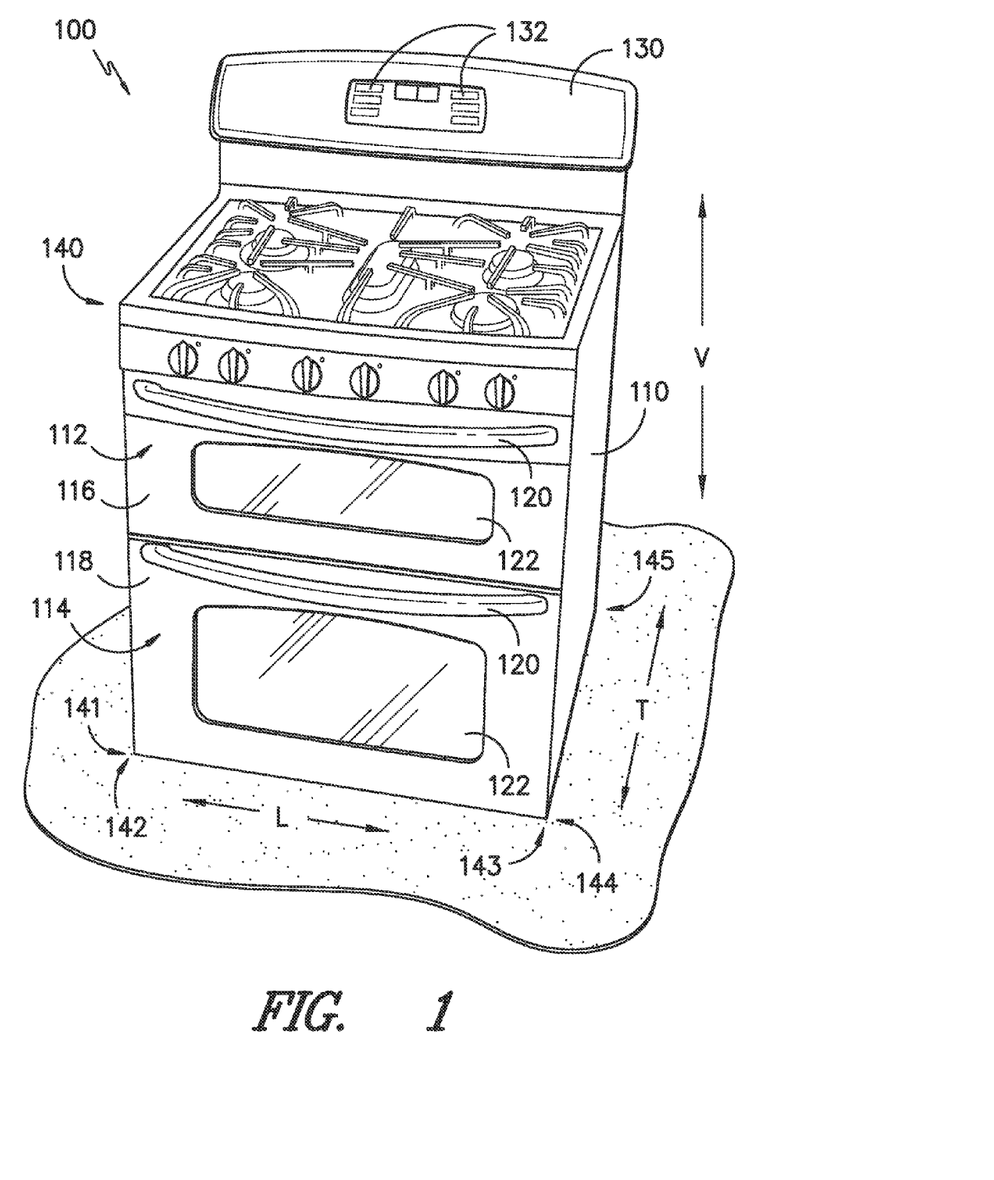
FIG. 1 provides a perspective view of a double oven appliance according to an exemplary embodiment of the present subject matter.

FIG. 1 provides a perspective view of a double oven appliance 100 according to an exemplary embodiment of the present subject matter. Double oven appliance 100 defines a vertical direction V, a lateral direction L and a transverse direction T. The vertical, lateral and transverse directions are mutually perpendicular and form an orthogonal direction system. As will be understood by those skilled in the art, double oven appliance 100 is provided by way of example only, and the present subject matter may be used in any suitable double oven appliance.

Double oven appliance 100 includes an insulated cabinet 110. Cabinet 110 extends between a top portion 140 and a bottom portion 141, e.g., along the vertical direction V. Thus, top and bottom portions 140 and 141 of cabinet 110 are spaced apart from each other, e.g., along the vertical direction V. Cabinet 110 also extends between a first side portion 142 and a second side portion 143, e.g., along the lateral direction L. Thus, first and second side portions 142 and 143 of cabinet 110 are spaced apart from each other, e.g., along the lateral direction L. Cabinet 110 further extends between a front portion 144 and a back portion 145, e.g., along the transverse direction T. Thus, front and back portions 144 and 145 of cabinet 110 are spaced apart from each other, e.g., along the transverse direction T.

As may be seen in FIG. 1, cabinet 110 defines an upper cooking chamber 112 and a lower cooking chamber 114. Upper cooking chamber 112 is positioned at or adjacent top portion 140 of cabinet 110. Conversely, lower cooking chamber 114 is positioned at or adjacent bottom portion 141 of cabinet 110. Thus, upper and lower cooking chambers 112 and 114 are spaced apart from each other along the vertical direction V. Upper and lower cooking chambers 112 and 114 can have any suitable size relative to each other. For example, as shown in FIG. 1, upper cooking chamber 112 can be smaller than lower cooking chamber 114.

Upper and lower cooking chambers 112 and 114 are configured for the receipt of one or more food items to be cooked. Double oven appliance 100 includes an upper door 116 and a lower door 118 rotatably attached to cabinet 110, e.g., with a hinge (not shown), in order to permit selective access to upper cooking chamber 112 and lower cooking chamber 114, respectively. Handles 120 are mounted to upper and lower doors 116 and 118 to assist a user with opening and closing doors 116 and 118 in order to access cooking chambers 112 and 114. As an example, a user can pull on handle 120 mounted to upper door 116 to open or close upper door 116 and access upper cooking chamber 112. Glass window panes 122 provide for viewing the contents of upper and lower cooking chambers 112 and 114 when doors 116 and 118 are closed and also assist with insulating upper and lower cooking chambers 112 and 114. As illustrated further in FIGS. 2 through 5 and discussed herein, heating elements, such as electric resistance heating elements, gas burners, microwave elements, etc., are positioned within upper and lower cooking chambers 112 and 114 of cabinet 110 for heating upper and lower cooking chambers 112 and 114.

A control panel 130 of range appliance 100 is positioned at top portion 140 and back portion 145 of cabinet 110. Control panel 130 includes user inputs 132. Control panel 130 provides selections for user manipulation of the operation of range appliance 100. For example, a user can touch control panel 130 to trigger one of user inputs 132. In response to user manipulation of user inputs 132, various components of the range appliance 100 can be operated.

Figure 2:
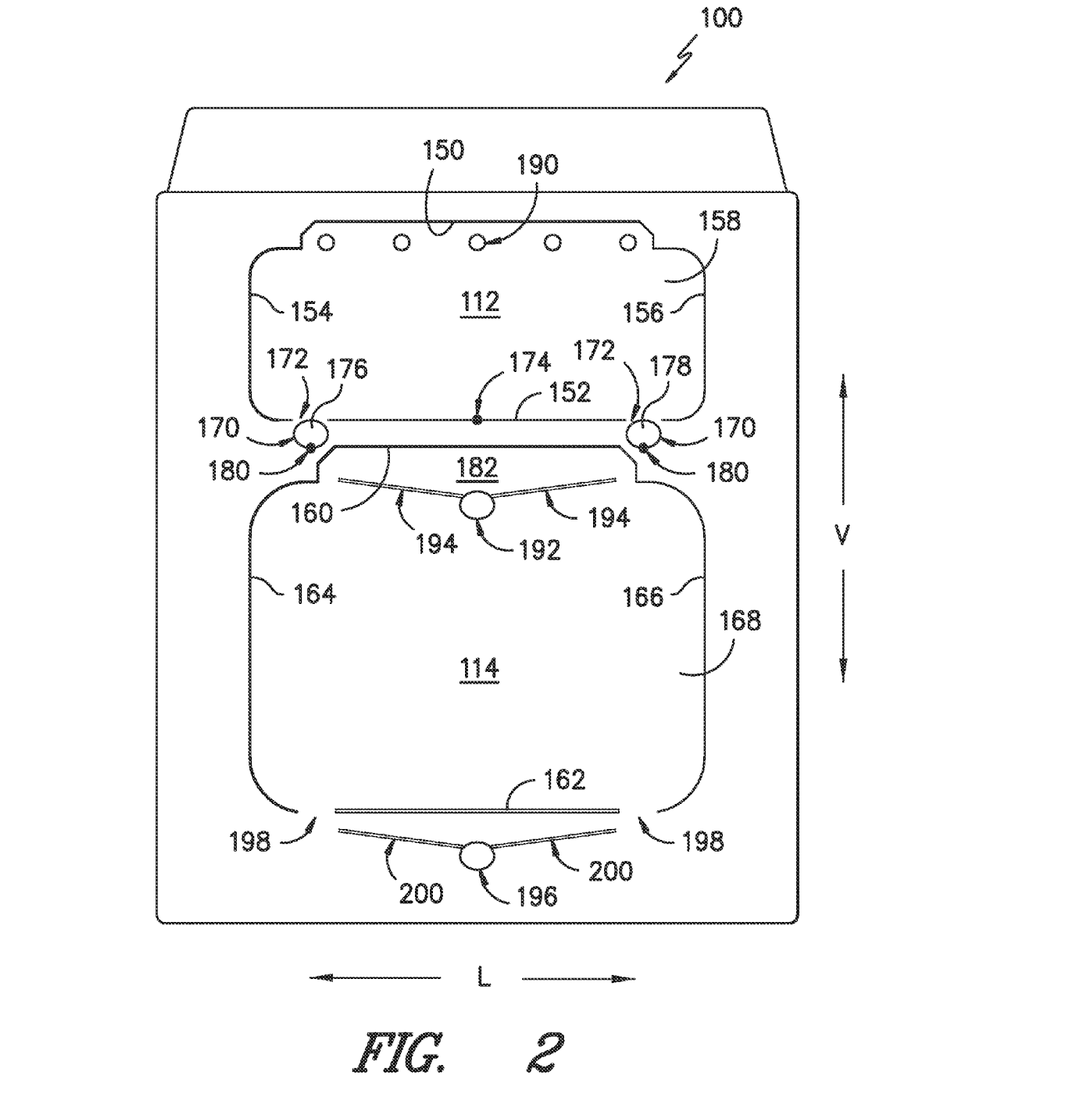
FIG. 2 provides a front cross-sectional schematic view of a double oven appliance according to an exemplary embodiment of the present subject matter.

FIGS. 2 through 5 illustrate various internal schematic views of double oven appliances 100 according to the present disclosure. As shown, various sidewalls define the upper cooking chamber 112 and the lower cooking chamber 114. For example, upper cooking chamber 112 includes a top wall 150 and a bottom wall 152 which are spaced apart along the vertical direction V. Left sidewall 154 and right sidewall 156 (as defined according to a front view as shown in FIG. 2) extend between the top wall 150 and bottom wall 152, and are spaced apart along the lateral direction L. A rear wall 158 may additionally extend between the top wall 150 and bottom wall 152 as well as between the left sidewall 154 and right sidewall 156, and is spaced apart from the upper door 116 along the transverse direction T. Upper cooking chamber 112 is thus defined between the top wall 150, bottom wall 152, left sidewall 154, right sidewall 156, and rear wall 158.

Similarly, lower cooking chamber 114 includes a top wall 160 and a bottom wall 162 which are spaced apart along the vertical direction V. Left sidewall 164 and right sidewall 166 (as defined according to a front view as shown in FIG. 2) extend between the top wall 160 and bottom wall 162, and are spaced apart along the lateral direction L. A rear wall 168 may additionally extend between the top wall 160 and bottom wall 162 as well as between the left sidewall 164 and right sidewall 166, and is spaced apart from the upper door 118 along the transverse direction T. Lower cooking chamber 114 is thus defined between the top wall 160, bottom wall 162, left sidewall 164, right sidewall 166, and rear wall 168.

As further illustrated in FIGS. 2 through 5, appliance 100 includes one or more baking gas burners 170 disposed adjacent the bottom wall 152 of upper cooking chamber 112. Burners 170 are configured to heat the upper cooking chamber 112, such as to cook food items therein. As shown, a baking gas burner 170 is disposed below the upper cooking chamber 112 along the vertical direction V, such as between the upper cooking chamber 112 and the lower cooking chamber 114. One or more apertures 172 may be defined in the bottom wall 152, through which heat from burners 170 may flow into the upper cooking chamber 112. Advantageously, at least a portion of each baking gas burner 170 may be spaced from a center point 174 of the upper cooking chamber 112, such as of the bottom wall 152, along the lateral direction L. For example, at least a portion of burners 170 may be positioned adjacent the left sidewall 156 and/or right sidewall 158. At least a portion of each burner 170 may thus be between the left sidewall 156 or right sidewall 158 and the center point 174, such as in some embodiments closer along the lateral direction L to the left sidewall 156 or right sidewall 158 than the center point 174. Such positioning of the burners advantageously eliminates the need for flame spreaders attached to the burners 170, and can facilitate relatively even cooking in the upper cooking chamber 112, reducing the risk of overheating, overcooking, etc.

In exemplary embodiments as shown, the one or more burners 170 include a first burner 176 and a second burner 178. As discussed above, at least a portion of these first and second burners 176, 178 are spaced apart from the center point 174 and each other along the lateral direction L. For example, in some embodiments, the first and second burners 176, 178 are opposite each other relative to the center point 174 along the lateral direction L. Thus, the first and second burners 176, 178 may generally mirror each other relative to the center point 174 and along the lateral direction.

Figure 4:
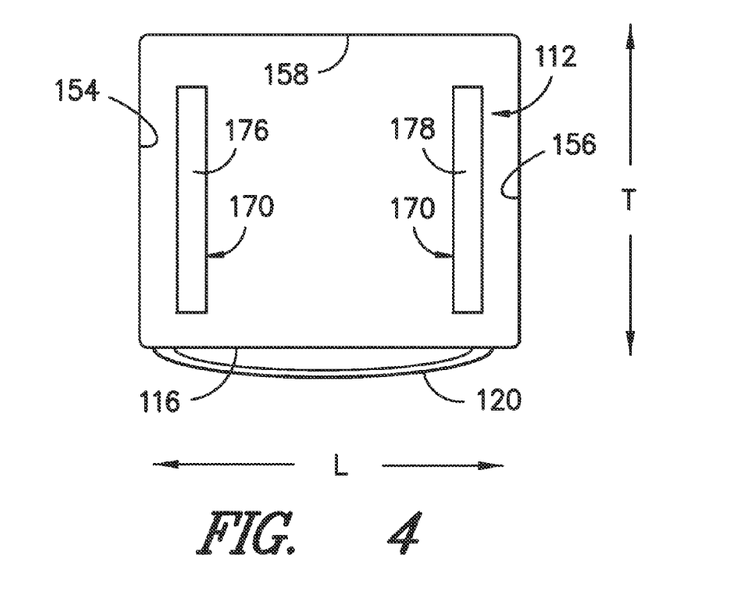
FIG. 4 provides a top cross-sectional schematic view of first and second baking gas burners adjacent an upper cooking chamber according to an exemplary embodiment of the present subject matter.
Figure 5:
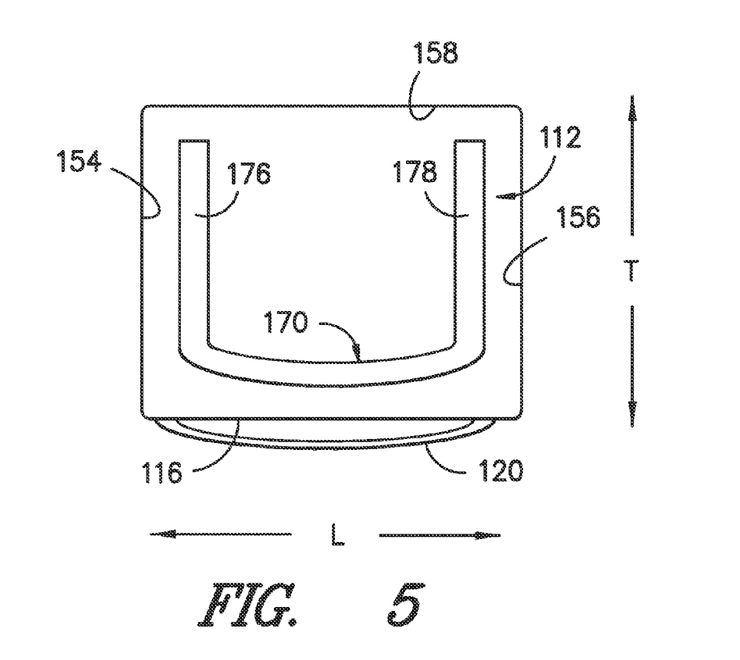
FIG. 5 provides a top cross-sectional schematic view of first and second baking gas burners adjacent an upper cooking chamber according to another exemplary embodiment of the present subject matter.

Referring to FIG. 4, in some embodiments, the first and second burners 176, 178 are independent from one another. In these embodiments, the burners 176,178 may for example be spaced apart from one another along the lateral direction L and relative to the center point 174. In other embodiments, as shown in FIG. 5, the first and second burners 176, 178 are first and second portions of a baking gas burner 170 having a generally U-shape or other suitable shape. For example, when viewed in a top or bottom view such as shown in FIG. 5, a baking gas burner 170 may have a generally U-shaped formation, with the first and second portions thereof connecting to form a bottom portion of the U-shape. Such connection may occur adjacent the upper door 116 as illustrated, or alternatively the rear wall 158, along the transverse direction T and the center point 174 along the lateral direction L, such that when viewed from a front view as shown for example in FIG. 2 the first and second portions appear separate and spaced apart along the lateral direction L. Accordingly, at least a portion of the first and second burners 176, 178 in these embodiments are spaced apart from each other, while other portions are connected to form the U-shape (or other suitable shape).

Referring again to FIGS. 2 and 3, in some exemplary embodiments, at least a portion of the top wall 160 of the lower cooking chamber 114 is above a bottom point 180 of one or more of the baking gas burners 170 along the vertical direction V. Advantageously, by moving the baking gas burners 170 along the lateral direction L so that they are spaced from the center point 174, a generally central area along the lateral direction L may be available for extension of the lower cooking chamber 114 towards the upper cooking chamber 112, thus increasing the usable volume of the lower cooking chamber 114. Thus, at least a portion of the top wall 160 may be extended upwards along the vertical direction V (wherein movement towards top portion 140 and away from bottom portion 141 is considered "upwards") so that it is above a bottom point 180 of one or more of the baking gas burners 170. Bottom point 180 is generally the bottom-most point of a burner 170, such as the bottom-most portion of a burner 170 wherein flames reside during operation.

Figure 3:
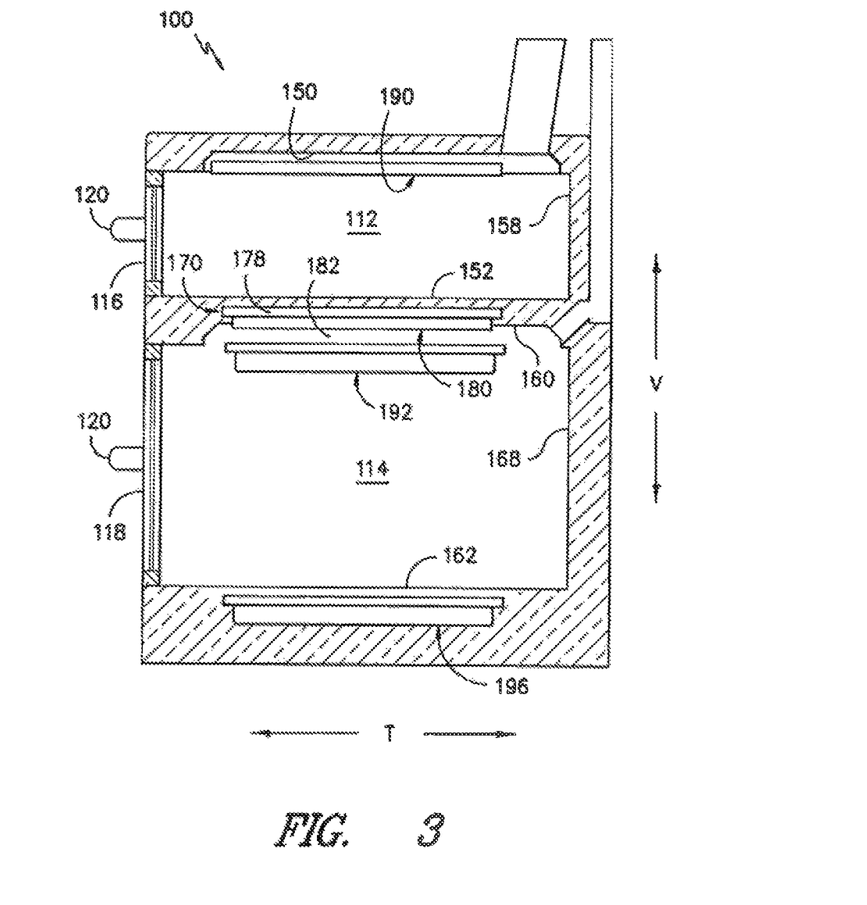
FIG. 3 provides a side cross-sectional schematic view of a double oven appliance according to an exemplary embodiment of the present subject matter.

As shown, for example, in some embodiments lower cooking chamber 114 includes an upper cavity 182 extending upwards therefrom along the generally vertical direction V. The upper cavity 182 includes the portion of the top wall 160 that is above the bottom point 180 of the one or more burners 170 along the vertical direction V. Upper cavity 182 may further extend along the lateral direction L between, for example, first and second burners 176, 178.

As further illustrated in FIGS. 2 and 3, double oven appliance 100 may further include various other burners disposed therein and positioned adjacent the various top walls 150, 160 and bottom wall 162. Any suitable burners, such as baking gas burners, broiling gas burners, or electric burners may be so utilized. In one embodiment, for example, an electric burner 190 may be disposed adjacent the top wall 150 of the upper cooking chamber 112. Burner 190 may be configured to heat the upper cooking chamber 112, such as to cook food items therein. As shown, burner 190 may be disposed within the upper cooking chamber 112.

Further, in some embodiments, a broiling gas burner 192 may be disposed adjacent the top wall 160 of the lower cooking chamber 114. Burner 192 may be configured to heat the lower cooking chamber 114, such as to cook food items therein. As shown, burner 192 may be disposed within the lower cooking chamber 114. Further, in some embodiments flame spreaders 194, which may be for example generally metallic sheets, may be connected to and extend from the burner 192 to distribute the burner 192 flame and/or heat. Notably, in some exemplary embodiments, portions or all of the burner 192 and/or flame spreaders 194 may be disposed within the upper cavity 182 of lower cooking chamber 114 along the vertical direction V, thus increasing the useable area of the lower cooking chamber 114 as discussed above.

Further, in some embodiments, a baking gas burner 196 may be disposed adjacent the bottom wall 162 of the lower cooking chamber 114. Burner 196 may be configured to heat the lower cooking chamber 114, such as to cook food items therein. As shown, baking gas burner 196 may be disposed below the lower cooking chamber 114 along the vertical direction V. One or more apertures 198 may be defined in the bottom wall 162, through which heat from burners 196 may flow into the lower cooking chamber 114. Further, in some embodiments flame spreaders 200, which may be for example generally metallic sheets, may be connected to and extend from the burner 196 to distribute the burner 196 flame and/or heat.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A double oven appliance that defines a vertical direction, a lateral direction, and a transverse direction that are each perpendicular to each other, comprising:
　　a cabinet that extends between a top portion and a bottom portion along the vertical direction;
　　an upper cooking chamber defined adjacent the top portion of the cabinet, the upper cooking chamber comprising a top wall and a bottom wall spaced apart along the vertical direction.
　　a lower cooking chamber defined adjacent the bottom portion of the cabinet, the lower cooking chamber comprising a top wall and a bottom wall spaced apart along the vertical direction;
　　a baking gas burner disposed adjacent the bottom wall of the upper cooking chamber and configured to heat the upper cooking chamber, at least a portion of the baking gas burner spaced apart from a center point of the upper cooking chamber along the lateral direction such that a space is defined between the at least a portion of the baking gas burner and the center point along the lateral direction,
　　wherein at least a portion of the top wall of the lower cooking chamber is above a bottom point of the baking gas burner along the vertical direction and is positioned within the space along the lateral direction.

2. The double oven appliance of claim 1, wherein the baking gas burner is a first baking gas burner, and further comprising a second baking gas burner, at least a portion of the first and second baking gas burners spaced apart from the center point and each other along the lateral direction.

3. The double oven appliance of claim 2, wherein the first and second baking gas burners are first and second portions of a generally U-shaped baking gas burner.

4. The double oven appliance of claim 2, wherein the first and second baking gas burners are independent from each other.

5. The double oven appliance of claim 1, wherein an upper cavity extends from the lower cooking chamber along the generally vertical direction, and wherein the upper cavity includes the portion of the top wall that is above the bottom point of the baking gas burner along the vertical direction.

6. The double oven appliance of claim 1, further comprising an electric burner disposed adjacent the top wall of the upper cooking chamber and configured to heat the upper cooking chamber.

7. The double oven appliance of claim 1, further comprising a broiling gas burner disposed adjacent the top wall of the lower cooking chamber and configured to heat the lower cooking chamber.

8. The double oven appliance of claim 7, further comprising a flame spreader connected to the broiling gas burner disposed adjacent the top wall of the lower cooking chamber.

9. The double oven appliance of claim 1, further comprising a baking gas burner disposed adjacent the bottom wall of the lower cooking chamber and configured to heat the lower cooking chamber.

10. A double oven appliance that defines a vertical direction, a lateral direction, and a transverse direction that are each perpendicular to each other, comprising:
a cabinet that extends between a top portion and a bottom portion along the vertical direction;
an upper cooking chamber defined adjacent the top portion of the cabinet, the upper cooking chamber comprising a top wall and a bottom wall spaced apart along the vertical direction;
a lower cooking chamber defined adjacent the bottom portion of the cabinet, the lower cooking chamber comprising a top wall and a bottom wall spaced apart along the vertical direction; and
a first baking gas burner and a second baking gas burner disposed adjacent the bottom wall of the upper cooking chamber and configured to heat the upper cooking chamber, at least a portion of the first and second baking gas burners spaced from and opposite each other relative to a center point of the upper cooking chamber along the lateral direction such that a space is defined between the at least a portion of the first baking gas burner and the at least a portion of the second baking gas burner along the lateral direction,
wherein at least a portion of the top wall of the lower cooking chamber is above a bottom point of the first baking gas burner and the second baking gas burner along the vertical direction and is positioned within the space along the lateral direction.

11. The double oven appliance of claim 10, wherein the first and second baking gas burners are first and second portion of a generally U-shaped baking gas burner.

12. The double oven appliance of claim 10, wherein the first and second baking gas burners are independent from each other.

13. The double oven appliance of claim 10, wherein an upper cavity extends from the lower cooking chamber along the generally vertical direction, and wherein the upper cavity includes the portion of the top wall that is above the bottom point of the first baking gas burner and the second baking gas burner along the vertical direction.

14. The double oven appliance of claim 10, further comprising an electric burner disposed adjacent the top wall of the upper cooking chamber and configured to heat the upper cooking chamber.

15. The double oven appliance of claim 10, further comprising a broiling gas burner disposed adjacent the top wall of the lower cooking chamber and configured to heat the lower cooking chamber.

16. The double oven appliance of claim 15, further comprising a flame spreader connected to the broiling gas burner disposed adjacent the top wall of the lower cooking chamber.

17. The double oven appliance of claim 10, further comprising a baking gas burner disposed adjacent the bottom wall of the lower cooking chamber and configured to heat the lower cooking chamber.

* * * * *

UNITED STATES PATENT AND TRADEMARK OFFICE
CERTIFICATE OF CORRECTION

| | | |
|---|---|---|
| PATENT NO. | : 9,504,351 B2 | Page 1 of 1 |
| APPLICATION NO. | : 14/051507 | |
| DATED | : November 29, 2016 | |
| INVENTOR(S) | : Paul Bryan Cadima | |

It is certified that error appears in the above-identified patent and that said Letters Patent is hereby corrected as shown below:

On the Title Page

Under Assignee (73) reads "Haler US Appliance Solutions, Inc., Wilmington, DE (US)" should read "Haier US Appliance Solutions, Inc., Wilmington, DE (US)"

Signed and Sealed this
Third Day of June, 2025

Coke Morgan Stewart
*Acting Director of the United States Patent and Trademark Office*